United States Patent [19]

Reunamäki

[11] 4,390,359
[45] Jun. 28, 1983

[54] METHOD OF AND APPARATUS FOR PREVENTING THE CURVING OF GLASS SHEETS IN THE ROLLER-EQUIPPED FURNACE OF A HORIZONTAL TEMPERING PLANT

[75] Inventor: Pauli Reunamäki, Nattari, Finland
[73] Assignee: Tamglass Oy, Tampere, Finland
[21] Appl. No.: 300,374
[22] Filed: Sep. 8, 1981
[30] Foreign Application Priority Data
  Sep. 12, 1980 [FI] Finland ................................ 802866
[51] Int. Cl.³ ............................................. C03B 27/04
[52] U.S. Cl. ........................................ 65/114; 65/104; 65/268; 65/119; 65/350; 65/351
[58] Field of Search ................ 65/268, 273, 104, 106, 65/107, 25.4, 114, 119, 350, 351, 348
[56] References Cited
U.S. PATENT DOCUMENTS
  3,425,818  2/1969  Plumat .............................. 65/350 X
  3,431,095  3/1969  Ross .................................. 65/350 X
  3,792,993  2/1974  Artama et al. ..................... 65/350 X FOREIGN PATENT DOCUMENTS
  408494  4/1934  United Kingdom ................. 65/119

OTHER PUBLICATIONS
Handbook of Glass Manufacturing, vol. II, pp. 820–832.

*Primary Examiner*—Arthur D. Kellogg
*Attorney, Agent, or Firm*—James & Franklin

[57] ABSTRACT

A method for the prevention of the curving of glass sheets in the roller-equipped furnace of a horizontal tempering plant utilizes a substantially turbulent air flow over the upper surface of the glass sheet for intensifying the convection heat action applied to the upper surface of the glass sheet. The furnace is fitted with perforated pipes which are connected to a source of compressed air for blowing horizontal air jets above the upper surface of the glass sheet.

13 Claims, 6 Drawing Figures

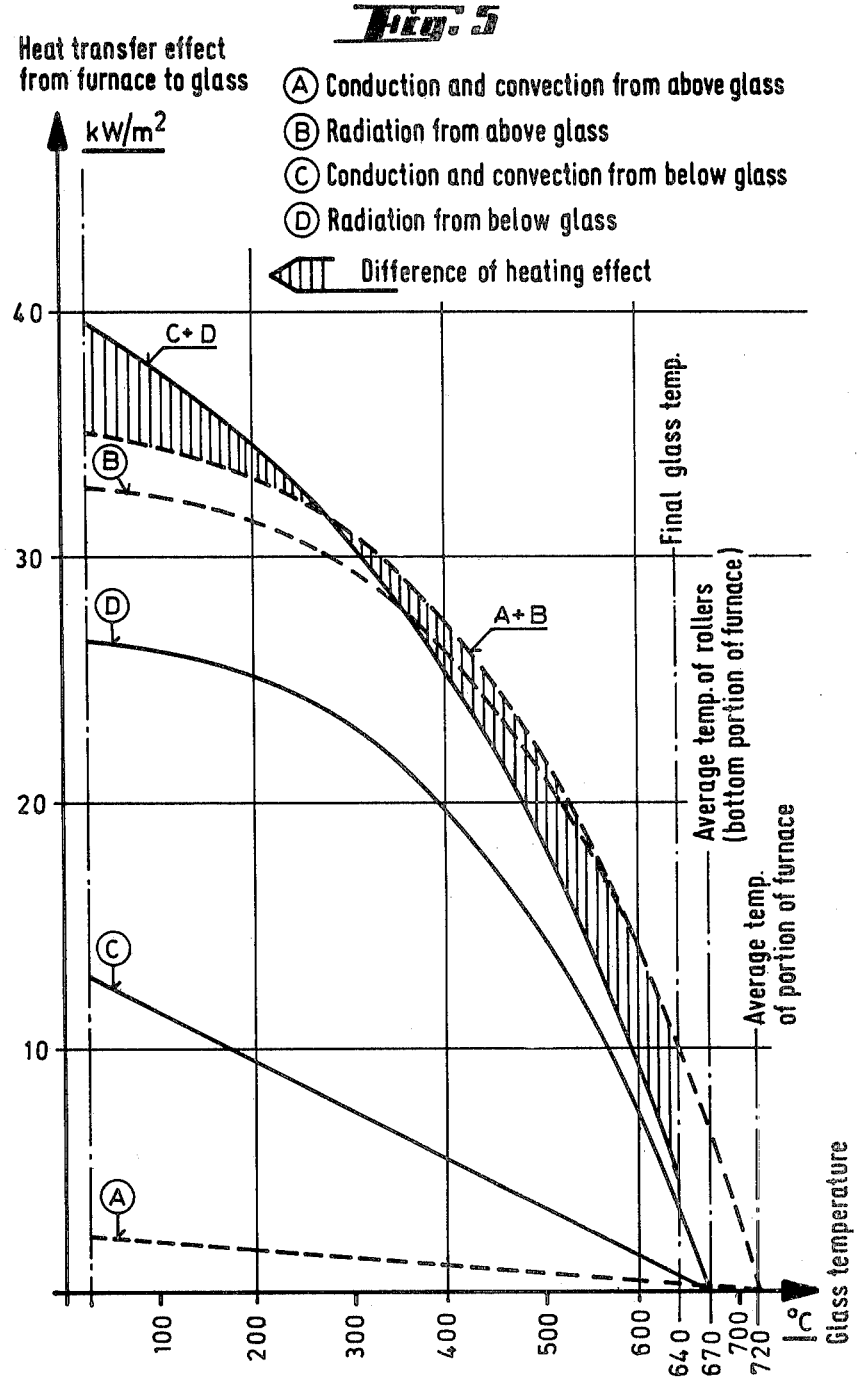

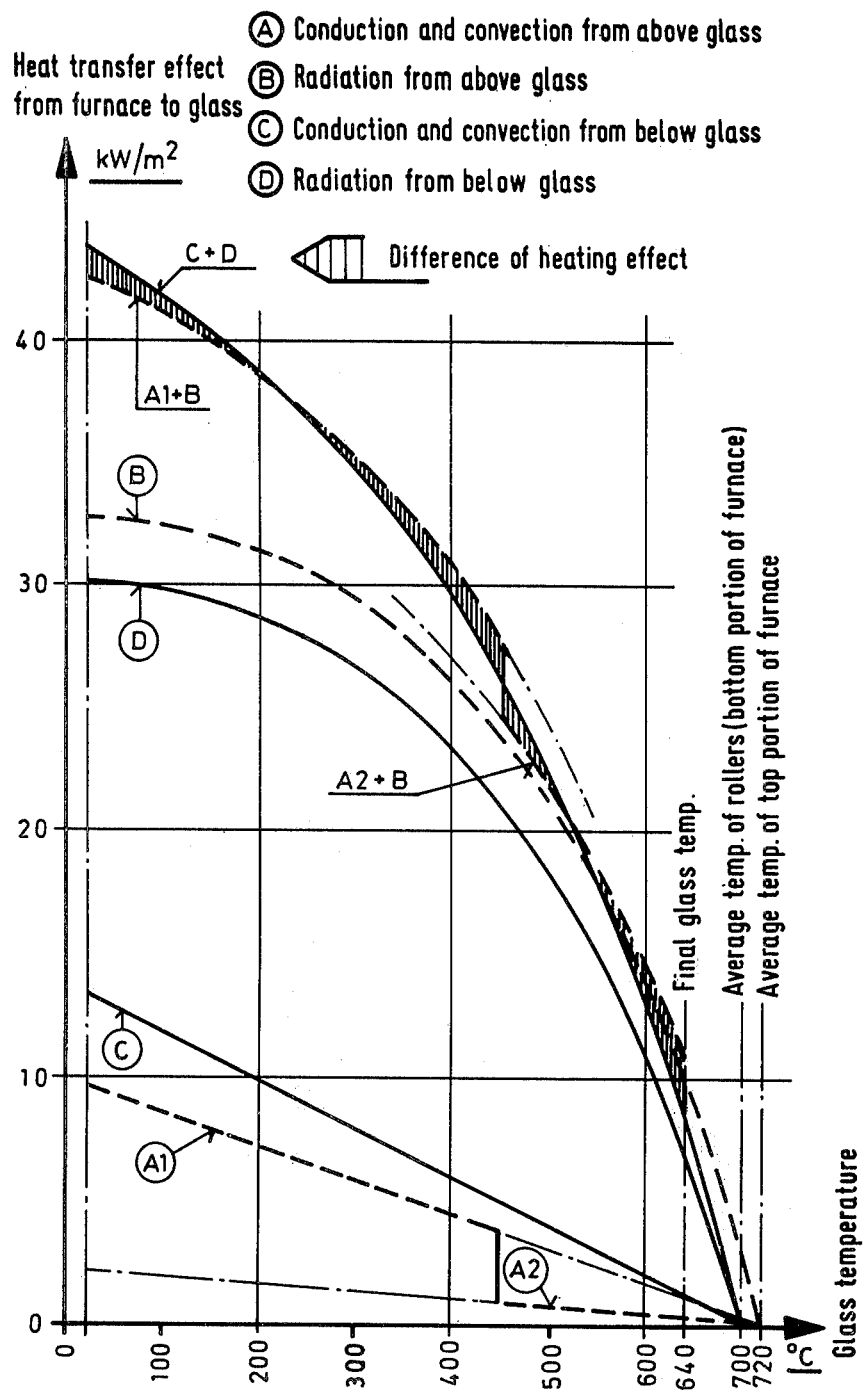

METHOD OF AND APPARATUS FOR PREVENTING THE CURVING OF GLASS SHEETS IN THE ROLLER-EQUIPPED FURNACE OF A HORIZONTAL TEMPERING PLANT

BACKGROUND OF THE INVENTION

For the beginning, we study the problem to be solved by the present invention as well as the solutions of the prior art. When a cold glass sheet is moved into a hot furnace the temperature of which exceeds 700° C. and which is fitted with rollers, the glass initially curves vigorously, so that the edges of glass rise upwards. This phenomenon is quite natural with the rollers emitting heat to the glass at a quicker rate than that received by glass from the top portion of the furnace. The main reason for this phenomenon is the rollers carrying and conveying the glass. The rollers conduct heat to glass by contacting it and, on either side of the point of contact, there is a relatively wide zone in which the roller is very close to the glass, whereby heat is transferred by conduction through a medium (air). It can be calculated that, if a furnace contains rollers at 120 mm relative distances and the diameter of the rollers is approximately 95 mm, the heat flow being transferred from such a roller track through conduction exceeds that emitted from an analogous plane surface which would lie at a distance of 3 mm from the glass. In the furnace conditions, this corresponds to a heat transfer coefficient of approximately 20 W/m2° C.

A drawback caused by this initial curving is that the central portion of glass warms up considerably faster than the edges which may result in a serious optical error as a long stripe in the central portion of the glass where the only point of contact with rollers has been.

In addition, the rollers also leave marks in the same portion of glass resulting in a completely useless sheet of glass. The reason for such marks is naturally the fact that the linear support of rollers is applied to an extremely narrow portion in the central of glass so that the surface structure of the glass tends to become fractured or grated.

In the following study the transfer of heat to the glass has been divided into three components: radiation, conduction and convection, since this is the only way to readily explain the above-mentioned detrimental phenomenon in a heating furnace. As from above the glass, the heat primarily transfers through radiation and convection, the share of conduction heat is so insignificant that it can be ignored in the study.

The situation is different on the bottom surface of the glass since, in addition to radiation, there is a very strong conduction heat flow. The share of convection in the heat transfer is very hard to evaluate but, compared to conduction, it is definitely very small.

On the basis of a rough preliminary study of the behavior of these three forms of heat transfer in the heating step, it is possible to note that they differ considerably from each other:

I Radiation

It is well-known that radiation heat follows the formula derived from Stefan-Bolzmann law:

$$q_s = \epsilon_1 \cdot \epsilon_2 \cdot \sigma \cdot (T_1^4 - T_2^4)$$

$\epsilon_1$ = emission coefficient of a heat source (semi-space)
$\epsilon_2$ = emission coefficient of a heat receiver
$\sigma$ = Stefan-Bolzmann constant (5,67 W/m2(100° K.)$^4$)
$T_1$ = temperature of a heat source (semi-space)
$T_2$ = temperature of a heat receiver
$q_s$ = radiation energy (W/m2)
$\epsilon_1 \cdot \epsilon_2 = \epsilon$ whose value when heating glass is about 0,6

In diagrams 1 and 2, curves B and D illustrate the radiation heat flows calculated from the above formula with emission coefficient of $\epsilon = 0,6$, when the temperature of a particular emitting semispace is either 720° C., 700° C. or 670° C. (993° K., 973° K., or 943° K.) and temperature of the heating glass is the other variable.

It can be noted from the diagrams that heat transfer does not change very quickly at the early stages of heating even though the glass temperature rises. On the other hand, towards the end, the heating effect drops very steeply. As a matter of fact, the heat transfer coefficient increases all the time as the glass is heated.

On the basis of the foregoing, it is evident that, when trying to explain the behavior of glass in the furnace during heating, it is not possible to use any constant as heat transfer coefficient but the case must be illustrated with a diagram as we have done in this specification.

II Conduction and convection

Conduction is calculated from the formula:

$$g_j = \lambda(T_1 - T_2)/a$$

$g_j$ = heat flow (W/m2)
$\lambda$ = heat conductivity of gas (thin layer)
$T_1 - T_2$ = temperature difference
$a$ = distance of conduction In this case, the heat transfer coefficient is nearly constant, i.e. independent of the glass temperature. A minor change naturally occurs for the reason that, when the glass enters the furnace, the mean value of temperature between the rollers and glass is approximately 350° C. and when the glass leaves the furnace, the corresponding mean value is about 650°–670° C. Thus, the heat conductivity of air varies in the range of 0,048–0,064 W/m°C. which, relatively speaking, is a minor change since heat transfer through conduction is relatively small towards the end of the heating.

Diagram 1 of the drawings illustrates the heat transfer effect from furnace to glass. In diagram 1, conduction and convection have been combined for both above and below the glass heating. In both cases, the heat transfer coefficient has been presumed to be constant since, from above the glass, the convection heat flow is small anyway and the conduction heat flow of the lower side is of such a nature that it very closely depends only on the temperature difference. To be quite accurate, the conduction heat flow demonstrator C should be slightly upwardly curved the same way as heat radiation, and demonstrator A of the free convection heat flow should, on the contrary, be slightly downwardly curved.

The following methods are known for the prevention of the blending of glass or the drawbacks caused thereby:

1. The use of asbestos rollers or other corresponding fiber materials whose heat storage ability is small in view of the volume and whose heat conductivity is as small as possible. The basic idea of this procedure is that, with heat being first emitted quickly, the surface temperature of the roller decreases causing a vigorous change primarily in the radiation energy. This can be clearly noted by comparing demonstrators B and D in diagram 1, the former corresponding to the temperature of 720° C. and the latter to the temperature of 670° C. Later on, as the glass is warming up, the furnace will be capable of emitting more heat to the roller than the amount taken up by the glass, the temperature of the roller surface returning to its initial value which during loading is practically always lower than temperature of the furnace.

In such furnaces, the glass also initially bends very vigorously the edges upwards followed by relative quick straightening as a result of cooling of the rollers.

The use of such rollers, however, leads to some very detrimental characteristics:

1.1. The service life of the rollers is relatively short; in a continuous 3-shift work just one to three years.
1.2. As the rollers require a steel core with their well-kown creep properties, in a while the roller starts to "play" due to eccentricity.
1.3. Marks are easily formed in the center of the glass due to initial curving.
1.4. Warming up of the glass is very uneven, since the leading edge is capable of cooling the roller drastically and the central portion and the glass, which forms the trailing edge at any given time, warm up less. As the glass moves back and forth, the center remains much colder than the ends of the glass with the result that quality is poor and the glass fractures easily in tempering.
1.5. Cooling of the roller very much depends on the size and thickness of glass making the heat control difficult.
1.6 It is a general rule that the glasses must be washed after the tempering as a result of asbestos dust.

2. The rollers ae mounted further away from each other (fewer rollers). The detrimental heat conduction of the bottom side is practically directly proportional to the roller density, so the drawback can thus be diminished as far as the curving is concerned but, on the other hand, a lot more serious hazard emerges: the glass will be corrugated. If we consider the glass to be a sheet resulting on brackets, the bending stresses in the sheet, which stresses in fact represent the tendence of glass to become corrugated in soft condition, are directly proportional to the square of the distance between said rollers. Such corrugation in glass is one of the worst problems in horizontal tempering plants provided with roller support and thus, in practice, there is no chance at all to extend the distance between rollers.

3. Making the heating system of very small mass and quickly regulated. In this case, the basic idea is to compensate the powerful conduction heat flow with a corresponding heat effect from above the glass. A drawback in such an arrangement is the high price and complexity of the system, since it is necessary to anticipate in which part of the furnace the glass is travelling. Another, and a more detrimental, factor is the fact that, in any case, the heating system is to a certain degree slow, the control of temperatures in the furnace being difficult and, particularly with varying furnace loads, the control is next to impossible. Even this system does not eliminate the initial bending of glass but only cuts down its duration.

4. The length of a stroke is extended to be more than the longest glass load and the lower side heating is eliminated. The idea here is to decrease temperature of the rollers, whereby radiation energy, in particular, rapidly decreases. In practice, this alternative, the same way as alternative 3, requires very accurately controlled loading of the glasses and, hence, the load of the furnace. Temperature of the rollers immediately tends to equalize itself with that of the furnace if, for some reason, just one loading is omitted. To maintain temperature of the rollers quite low with respect to that of the furnace is really a hard task which can only be successfully achieved with the help of long experience and a lot of automatic data processing.

The worst drawback in this system is that bending of the glass with the edges upwards is indeed initially reduced but, correspondingly, towards the end of the heating said edges bend downwards, which means that the bending itself has not been eliminated but divided into two phases, so that bending in both directions is practically the same. The fact that, in the end, the glass bends with the edges downwards is indeed catastrophic in view of the service life of the roller, since the sharp edges bumping against the rollers cause indentations and scratches, especially when tempering thick glasses.

Before studying the solution of the present invention for the prevention of glass bending and the drawbacks caused thereby, we will examine the physical basis of glass bending. If we think of said glass as a sheet whose various surface sections receive their own heat flow at the heating stage, the heat flow which passes through the glass is the one that tends to equalize the heat flows of various intensities coming from outside. If we disregard the initial situation and transition period, which is a short period only, it can be said that, with normally temperable glass thicknesses, the final temperature difference will be reached in less than 10 seconds. Temperature difference between the surfaces approaches the limit value:

$$\Delta T = \frac{1}{2} \cdot \frac{\Delta q \cdot s}{\lambda} \qquad (1)$$

$\Delta T$ = temperature difference
$\Delta q$ = difference of heat flows to opposite surfaces
$s$ = thickness of glass
$\lambda$ = heat conductivity of glass The change of temperature within the glass is not linear but a second degree curve. However, the bending caused by this temperature difference can be calculated without essential error aes if the change were linear. (In practice, the glass bends moe than the bending calculated with linear temperature change.) Thus, the radius, according to which the glass curves, is obtained from the following formula:

$$R = \frac{ds}{d\phi} = \frac{s}{\alpha \cdot \Delta T} \qquad (2)$$

$R$ = radius of curvature
$\alpha$ = coefficient of heat transfer

When the bending is slight as compared to the length of the glass, value of the bending is obtained from the formula:

$$\delta = \frac{L^2}{8R} = \frac{\alpha \cdot \Delta T \cdot L^2}{8 \cdot s} \qquad (3)$$

$\delta$ = bend
$L$ = the length of glass corresponding to bend

The approximation formula, which illustrates bending of the glass depending on the difference between the heat flows received by the glass from different sides, is finally obtained by incorporating the temperature difference formula (1) in the bend formula (3).

$$\delta \approx \frac{a \cdot L^2 \cdot \Delta q}{16 \cdot \lambda}$$

In the normally used flat glass $a \approx 8{,}7 \cdot 10^{-6} 1/°C$. and $\lambda 1$ W/m.°C. If it is further presumed that $L=1$ m and $\Delta q=1{,}0$ kW/m2, the following formula will be obtained:

$$\delta = \frac{8{,}7 \cdot 1m2 \cdot 1000W \cdot °C \cdot m}{10^6 °C \cdot m2 \cdot 1 W \cdot 16} \approx 0{,}54 \cdot 10^{-3} m$$

In other words, we can assume as a rough rule that the bend for the length of 1 meter will be approximately 0,5 mm, when the difference between the heat flows received by the glass from various sides is 1,0 kW/m2. The bend is independent of the thickness of glass.

SUMMARY OF THE INVENTION

The basic idea of the solution defined in the accompanying claims is that, if it is possible to produce above the glass by means of forced convection a heat flow corresponding to the heat flow transferring primarily through conduction from the rollers below, the total heat flow is through the entire heating stage equal on either side of the glass sheet. In the ideal solution, in which temperature of the rollers does not decrease at all as a result of the load, this would indeed be true. But, since the rollers transfer the heat from the bottom of the furnace to the glass and, nevertheless, are themselves passive heat sources, their temperature will in fact slightly decrease in loaded condition.

Therefore, the invention adds to forced convection the additional feature that, approximately half-way through the heating cycle, the additional convection heating of the top surface of the glass is stopped whereby, in the end of the heating cycle, the tendency of glass to bend with the edges downwards is reduced.

This basic realization of the invention will be further detailed in the following by comparing diagrams 1 and 2 of the drawings.

Diagram 1 shows the heating effect as a function of glass temperature on either side of said glass, when the temperature of the top portion of the furnace is 720° C. and the rollers have cooled from this value, so that, viewed from the bottom side of the glass, the temperature corresponds to a 670° C. radiating surface. The straight line A represents the upper heat flow provided by conduction and convection. Coefficient of heat transfer is 3 W/m2° C. Straight line C corresponds to line A but viewed from below the glass. Coefficient of heat transfer is 20 W/m2° C. Curves B and D illustrate the transfer of radiation heat when the radiating surface is 720° C. (curve B) or 670° C. (curve D). The diagram further includes combined curves which illustrate total heat transfer to different sides of glass. The ruled section represents the effect or intensity difference between the surfaces of glass. The character of the ruled section corresponds fully to the above-described curving phenomenon of glass in a furnace. The diagram also shows that the intensity difference in the beginning and in the end of the heating cycle is about 5-6 kW/m2. In the beginning, the intensity on the top side of the glass is smaller, in the end vice versa. If the temperature on the bottom side of the glass (temperature of the rollers) decreases (curve D), it only means that the initial intensity difference diminishes but the final intensity difference respectively grows. The sum of the initial and final intensity differences is constant as long as in the beginning the combined curve $C+D > A+B$.

Diagram 2 corresponds to the above diagram 1. A difference is the temperature of the rollers which is higher than that in diagram 1 as well as the fact that the straight line A is divided into two sections: $A_2$ which completely corresponds to straight line A in diagram 1, and $A_1$ which shows the present demonstrator of forced convection as seen from above the glass. The idea is this system is to produce above the glass by means of forced convection a heat transfer which corresponds to that produced by the rollers below the glass through conduction. These forms of heat transfer behave the same way with respect to the temperature and temperature differences. However, since in practice it is impossible to develop a heat regulation system in which passive rollers would remain as hot as the furnace in general, the temperature of the rollers has been set 20° C. lower than that of the top portion of the furnace.

Forced convection (straight line $A_1$) would at the end of the heating cycle result in an unnecessarily great intensity difference (about 1-1,5 kW/m2 more) in the direction to bend glass edges downwards. Therefore, the forced convection has been interrupted during the heating cycle at the point where the glass temperature is about 450° C. which practically corresponds to the moment half-way through the heating period.

In addition to the above-described actions, in a practical furnace there is a phenomenon which slightly changes the curves disclosed in the diagrams. The phenomenon is that, when cold glass enters the furnace and settles on the rollers and is initially very powerfully affected thereby, the temperature of the rollers decreases. In the diagrams, temperature of the rollers has been maintained constant but, in fact, it is just the average of wave-like alteration whose difference range is 5° to 30° C. depending on the glass thickness as well as on whether the particular glass lies all the time on a given roller. This additional phenomenon changes diagram 1 in such a manner that the curving of the glass with the edges upwards turns quicker into the pending with the edges downwards and in the end the bending is not quite the magnitude the diagram would show as a result. In diagram 2, the procedure runs the same way as above, so the forced additional convection (straight line $A_1$) must be interrupted, so that the glass would not bend with the edges downwards. According to practical experience, with thin glasses (4-5 mm) the suitable moment of interruption is about 350° C. and with thick glasses (10-12 mm) about 200° C. Tests have further shown that the suitable moment of interrupting the additional convection is a constant period (about 60 seconds) after the glass entered the furnace. This is well explained by the fact that the roller starts cooling practically at constant speed when a cold glass moves into the furnace. Not until later, when the temperature difference between the furnace and glass decreases, does the greater decrease of the roller surface temperature caused by thicker glass begin to effect.

BRIEF DESCRIPTION OF THE DRAWING

An apparatus for carrying out the method of the invention has been schematically illustrated in the accompanying drawings, in which:

FIGS. 5 and 6 (diagrams 1 and 2, respectively) are graphs relating the heat transfer effect from furnace to glass to the temperature of the glass, for different sources of heat.

DETAILED DESCRIPTION OF THE PREFERRED EMBODIMENTS

Figure 1:
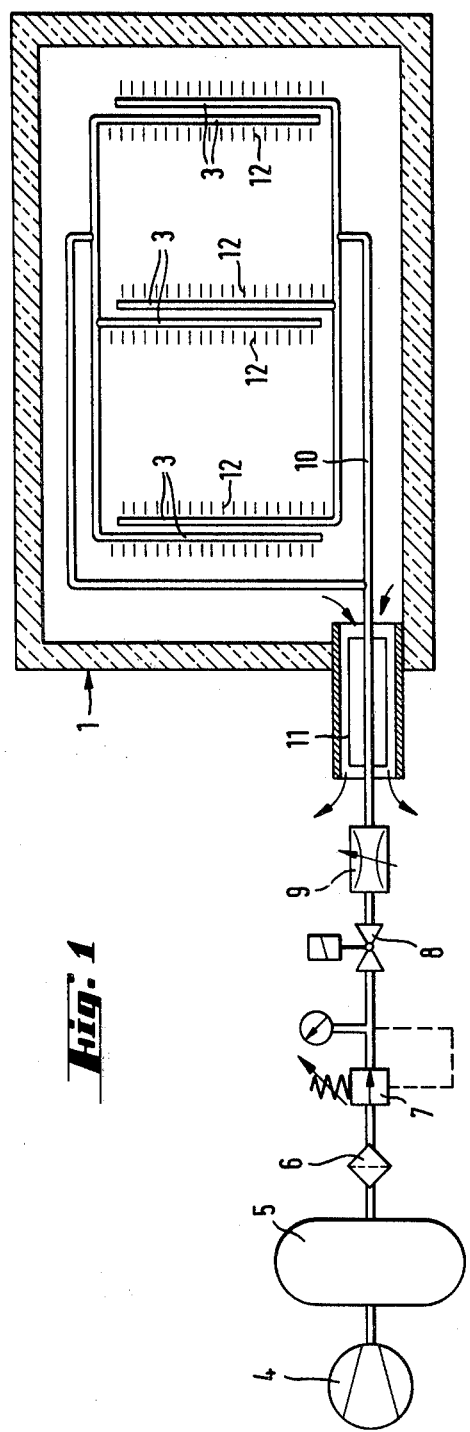
FIG. 1 shows the apparatus partially in top plan view and partially in schematic view.
Figure 2:
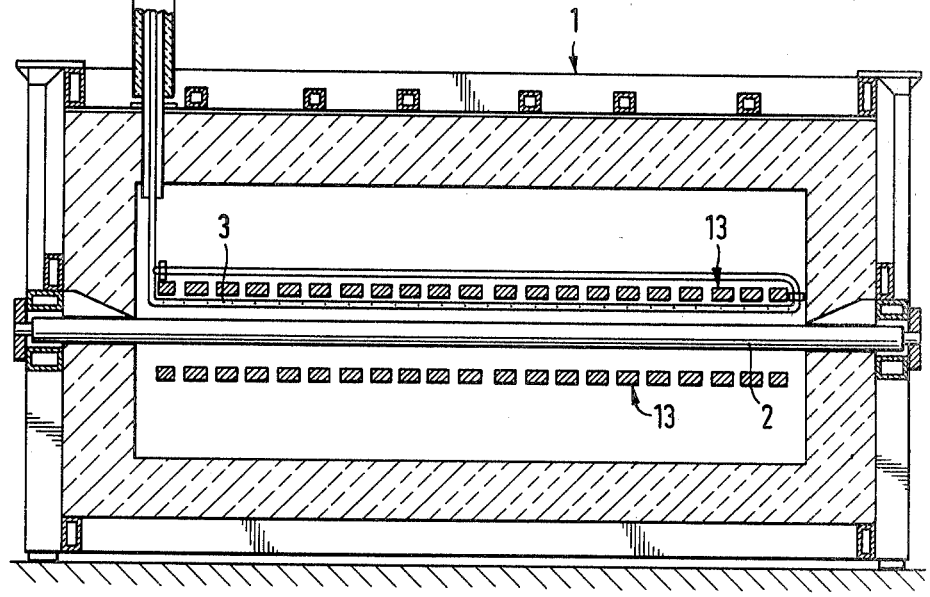
FIG. 2 shows a vertical cross-section of the apparatus.

Within furnace 1, about 50-60 mm above rollers 2 is mounted pressure air delivery pipes 3 made of heat resistant steel. Pipes 3 are disposed transversely in view of the travel direction of glass, i.e. in parallel relationship with rollers 2. Pipes 3 are disposed at approximately 1-2 m distances from each other and they are fed by a common compressed air supply from a compressor 4 through a pressure tank 5, filter 6, pressure reducer valve 7, magnetic valve 8 and a resistance valve 9. Connected to the through-passage (from outside into furnace) of an air supply pipe 10 can also be a heat exchanger 11. By virtue of the heat exchanger 11, compressed air can be preheated before blowing it into the furnace for increasing the critical blowing speed of air and, thus, such compressed air can be even better utilized with air jets 12 to be blasted into the furnace acting according to the injector principle. Each transverse pressure air delivery pipe 3 is provided with holes of about 1 mm in diameter horizontally in both directions at approximately 100 mm distances from each other. Pressure through the blasting holes is about 0,1-1,0 bar producing approximately 1-10 m/s average air speed into the surface of the glass. The discharge speed of air jets through said holes can be in the range of 150-500 m/s.

Figure 3:
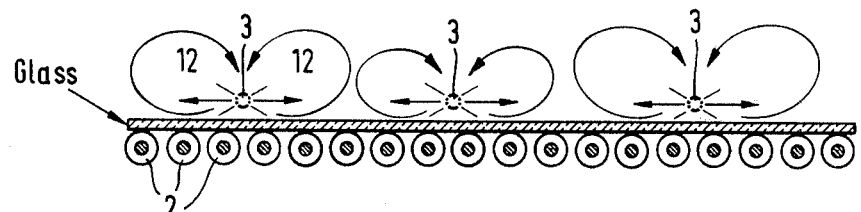
FIG. 3 is a schematic view of the air flow produced by the apparatus of the invention above a glass sheet.
Figure 4:
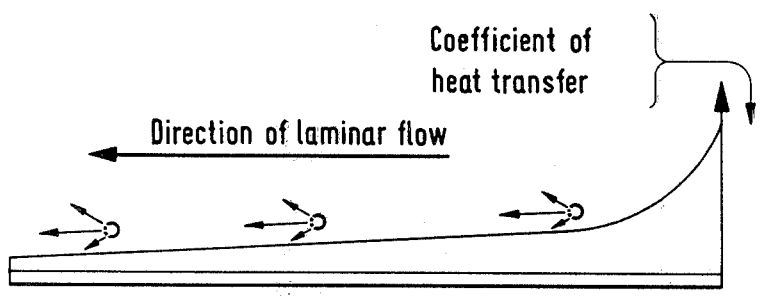
FIG. 4 is a graph illustrating the reduction of heat transfer coefficient in the zone of laminar flow in the travelling direction of air.

It is important to effect the blasts in both directions at the same time in order to make circulate short turns on the surface of the glass (FIG. 3) and, thus, a zone of laminar flow cannot appear (FIG. 4), in which zone heat transfer coefficient is rapidly reduced in the travel direction of air.

Consumption of compressed air is during the blast only about 4-20 m3/h per m2 flat glass in the furnace. For 6 mm glasses said consumption is thus (heating time 240 seconds and blasting time 60 seconds) 1-5 m3/h per m2.

In our test furnace, which treats glasses of 1,2×2,2 meters in size, the corresponding consumption is approximately 5-25 m3/h with a resulting heat demand only 1-5 kW. This is a small amount of energy as compared to the heating effect of a 175 kW furnace. By virtue of a heat exchanger, the heat loss has been dropped to half of the previous values.

Another feature which should be noted is the increase of furnace capacity because of the additional blasting which is why the loss effect, due to other heat losses of the furnace, is distributed to a greter number of glasses. Thus, it can be appreciated that energy consumption of the furnace per product unit does not increase but even decreases as a result of compressed air blasting.

The injector blasting provided with compressed air has several advantages in practice, namely that the system can be readily mounted on furnaces, it is quick and practically no mass is involved, nor does it prevent normal energy transfer from furnace to glass and, in addition, stepless regulation can be achieved.

I claim:

1. A method for the prevention of curving of glass sheets in the roller-equipped furnace of a horizontal tempering plant, wherein the glass sheets are passed in a horizontal plane, by means of a conveyor consisting of horizontal rollers, through a furnace, the opposite surfaces of the glass sheet being subjected to the conduction, convection and radiation heat action produced by resistance elements, rollers and the like furnace components disposed above and below the glass sheet, characterized by the step of blasting air so as to create on the upper surface of the glass sheet a substantially turbulent air flow for intensifying the convection heat action applied to the upper surface of the glass-sheet, the air being blasted by injection action near the upper surface of the glass sheet by narrow jets spaced along the length of the furnace and being directed at certain distances against each other for the creation of short circulating flows longitudinally of the furnace.

2. A method as defined in claim 1, characterized in that the air to be blasted in the furnace is preheated with air flowing out of the furnace.

3. A method as defined in claim 1, characterized in that the air flow, which produces additional convection, is interrupted during a heating cycle a predetermined period after the glass sheet moved into the furnace.

4. A method as defined in claim 1, characterized in that the air flow, which produces additional convection, is interrupted during a heating cycle when the glass has reached a certain temperature which, depending on the thickness of the glass, varies within the range of 200°-450° C.

5. A method as defined in claim 1, characterized in that the duration of the air flow, producing the additional convection, is controlled according to time or a measured glass temperature.

6. A method as defined in claim 1, characterized in that the air is blasted so as to create an average air flow speed of 1-10 meters/second with respect to the glass sheet.

7. A method for the prevention of curving of glass sheets in the roller-equipped furnace of a horizontal tempering plant, wherein the glass sheets are passed in a horizontal plane, by means of a conveyor consisting of horizontal rollers through a furnace, the opposite surfaces of the glass sheet being subjected to the conduction, convection and radiation heat action produced by resistance elements, rollers and the like furnace components disposed above and below the glass sheet, characterized by the step of blasting air longitudinally of said furnace in opposite directions so as to create on the upper surface of the glass sheet a substantially turbulent air flow for intensifying the convection heat action applied to the upper surface of the glass-sheet.

8. A method as defined in claim 7, characterized in that the air is blasted near the upper surface of the glass sheet lengthwise of the furnace by narrow jets which by injector action produce the turbulent flow.

9. A method as defined in claim 8, characterized in that the air jets are directed at certain distances against each other for the creation of short circulating flows longitudinally of the furnace.

10. Apparatus for preventing the curving of glass sheets in a horizontal tempering plant, said apparatus comprising a furnace, heating resistances disposed in the furnace for maintaining the temperature of the furnace close to the softening temperature of glass, and horizontal rollers disposed within the furnace for carrying a horizontal glass sheet and providing a conveyor therefor, said apparatus being characterized in that said furnace, between said rollers and said heating resistances thereabove, is fitted with perforated pipes for blowing horizontal air jets above the upper surface of the glass sheet, thereby to intensify the convection heat action applied to the upper surface of the glass sheet, said perforated pipes extending transversely of the furnace or in parallel relationship with said rollers and being provided with holes opening toward the front and rear end for blowing oppositely directed air jets.

11. Apparatus as defined in claim 10, characterized by additionally including a source of compressed air operatively communicating with said perforated pipes.

12. Apparatus for preventing the curving of glass sheets in a horizontal tempering plant, said apparatus comprising a furnace, heating resistances disposed in the furnace for maintaining the temperature of the furnace close to the softening temperature of glass, and horizontal rollers disposed within the furnace for carrying a horizontal glass sheet and providing a conveyor therefor, said apparatus being characterized in that said furnace, between said rollers and said heating resistances thereabove, is fitted with perforated pipes for blowing horizontal air jets longitudinally of the furnace in opposite directions above the upper surface of the glass sheet, thereby to intensify the convection heat action applied to the upper surface of the glass sheet.

13. Apparatus as defined in claim 12, characterized in that said perforated pipes extend transversely of the furnace or in parallel relationship with the rollers and are provided with holes opening towards the front and rear end for blowing oppositely directed air jets.

* * * * *